(12) United States Patent
Nilsson et al.

(10) Patent No.: US 8,876,157 B2
(45) Date of Patent: Nov. 4, 2014

(54) SYSTEM FOR PROTECTION OF A VULNERABLE ROAD USER AND METHOD FOR OPERATING THE SYSTEM

(71) Applicant: Volvo Car Corporation, Gothenburg (SE)

(72) Inventors: Par Nilsson, Moelndal (SE); Bjorn Johansson, Alingsas (SE); Stefan Jarvholm, Gothenburg (SE); Peter Harda, Torslanda (SE); Martin Ask, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/927,297

(22) Filed: Jun. 26, 2013

(65) Prior Publication Data
US 2014/0000974 A1    Jan. 2, 2014

(30) Foreign Application Priority Data

Jun. 27, 2012  (EP) .................................... 12173739

(51) Int. Cl.
*B60R 21/36*     (2011.01)
*B60R 21/0136*   (2006.01)
*B60R 21/0134*   (2006.01)
*B60R 21/38*     (2011.01)
*B60R 21/015*    (2006.01)

(52) U.S. Cl.
CPC ........... *B60R 21/015* (2013.01); *B60R 21/0136* (2013.01); *B60R 21/0134* (2013.01); *B60R 21/38* (2013.01); *B60R 21/36* (2013.01)
USPC ........... 280/735; 701/301; 180/271; 180/274; 342/72; 340/435; 340/436

(58) Field of Classification Search
USPC ............... 280/735; 701/45, 96, 301; 180/271, 180/167, 274; 340/435, 436; 307/10.1; 296/187.04
See application file for complete search history.

(56) References Cited

U.S. PATENT DOCUMENTS 6,329,910 B1 * 12/2001  Farrington ..................... 340/436
7,036,621 B2 *  5/2006  Takafuji et al. ................ 180/274

(Continued)

FOREIGN PATENT DOCUMENTS

DE    102004054072    5/2006
EP         1344696    9/2003

(Continued)

OTHER PUBLICATIONS

Extended European Search Report for EP 12173739.9, Completed by the European Patent Office on Nov. 29, 2012, 6 pages.

*Primary Examiner* — Paul N Dickson
*Assistant Examiner* — Darlene P Condra
(74) *Attorney, Agent, or Firm* — Brooks Kushman P.C.

(57) ABSTRACT

A method is provided for operating a system of a vehicle for protection of a vulnerable road user. The system includes a remote sensor, a contact-based sensor, and a pedestrian protection device. The method may include scanning a region in front of the vehicle by the remote sensor to detect a target object and, if a target object is detected, classifying the target object into an object category based on information from the remote sensor. The method may also include selecting the selectable fire interval of an evaluation algorithm using the object category as input and, if an impact is detected by the contact-based sensor, the contact-based sensor sending information about the impact to the evaluation algorithm. The method may also include the evaluation algorithm evaluating if the signal is within the selectable fire interval, and in that case activating the pedestrian protection device.

20 Claims, 3 Drawing Sheets

(56) References Cited

U.S. PATENT DOCUMENTS

| | | | |
|---|---|---|---|
| 7,630,806 B2* | 12/2009 | Breed | 701/45 |
| 7,671,723 B2 | 3/2010 | Theisen | |
| 7,775,316 B2* | 8/2010 | Hosokawa et al. | 180/271 |
| 7,905,314 B2 | 3/2011 | Mathevon et al. | |
| 2005/0125126 A1 | 6/2005 | Yopp | |
| 2006/0196716 A1* | 9/2006 | Hawes et al. | 180/274 |
| 2007/0131468 A1* | 6/2007 | Bullinger et al. | 180/282 |
| 2007/0162231 A1 | 7/2007 | Schlogl | |
| 2007/0228705 A1 | 10/2007 | Rao et al. | |
| 2009/0024282 A1* | 1/2009 | Roehm et al. | 701/45 |
| 2009/0143987 A1* | 6/2009 | Bect et al. | 701/301 |
| 2009/0204294 A1* | 8/2009 | Mack et al. | 701/45 |
| 2011/0125372 A1* | 5/2011 | Ito | 701/45 |

FOREIGN PATENT DOCUMENTS

| | | |
|---|---|---|
| GB | 2400353 | 10/2004 |
| WO | 2005012045 | 2/2005 |

\* cited by examiner

SYSTEM FOR PROTECTION OF A VULNERABLE ROAD USER AND METHOD FOR OPERATING THE SYSTEM

CROSS-REFERENCE TO RELATED APPLICATIONS

This application claims priority to European Patent Application No. 12173739.9 filed Jun. 27, 2012, the disclosure of which is incorporated in its entirety by reference herein.

TECHNICAL FIELD

The present disclosure relates to a method for operating a system of a vehicle for protection of a vulnerable road user. The disclosure further relates to the system and a vehicle comprising the system.

BACKGROUND

A modern vehicle may be equipped with pedestrian protection means or devices, such as a deployable bonnet and/or or one or more airbags covering the windscreen and/or the A-pillars of the vehicle. Such protection means are intended to mitigate the consequences for a vulnerable road user, e.g. a pedestrian or a cyclist, if a collision with the vehicle occurs. A collision between the vulnerable road user and the vehicle may be detected by a contact-based sensor and the pedestrian protection means may be activated. However, some of the protection means are irreversible, e.g. a pyro-technical bonnet lifter or an inflatable airbag, and thus need to be replaced after use. This may lead to costly repairs and/or vehicle user dissatisfaction. There is therefore a desire to avoid activating an irreversible protection means, if it will not help to mitigate the consequence of a collision.

Document US 2007/0228705 A1 discloses a method of comprising:

scanning a frontal zone with a pre-crash sensing system and generating a pre-crash signal;

classifying a collision in response to the pre-crash signal;

determining a pre-crash collision confidence factor; and when the confidence factor is high, deploying a restraint system in pre-collision mode;

when the confidence factor is low, confirming a collision with vehicle collision sensors and deploying the restraint system in collision mode.

In addition to the pre-crash sensing system, the vehicle described in US 2007/0228705 comprises a contact-based sensor having a predetermined threshold. If an impact is determined with a severity over the predetermined threshold, the method completes the activation of the safety devices of the restraint system.

SUMMARY

The object of the present disclosure is to overcome or ameliorate at least one of the disadvantages of the prior art, or to provide a useful alternative.

It is desirable to provide a system being adapted to activate an irreversible protection means, if it will help, and not activating it, if it will not help.

The object above may be achieved by the method according to claim 1.

Thus, in a first aspect of the present disclosure there is provided a method for operating a system of a vehicle for protection of a vulnerable road user, the system comprising a remote sensor, a contact-based sensor and a pedestrian protection means.

The method comprises the steps of:

scanning a region in front of the vehicle by means of the remote sensor in order to detect a target object, if a target object is detected, classifying the target object into an object category based on information from the remote sensor, selecting a selectable fire interval of an evaluation algorithm using the object category as input, if an impact is detected by the contact-based sensor, the contact-based sensor sending information about the impact as a signal to the evaluation algorithm, the evaluation algorithm evaluating if the signal is within the selectable fire interval, and in that case activating the pedestrian protection means.

The information from the remote sensor is thus used for selecting the fire interval of the evaluation algorithm. The evaluation algorithm is used for deciding whether or not to activate the pedestrian protection means. The actual fire interval thus depends on the current information from the remote sensor used for the object classification. The fire interval thus changes when the vehicle moves and different target objects are detected. The use of a selectable fire interval helps to only activate an irreversible protection means in case it will actually be helpful, and not to activate it if it will not help.

The fire interval is defined by a lower fire threshold and an upper fire threshold, such that the pedestrian protection means is activated if the signal is within the fire interval. The selection of the selectable fire interval is thus done by setting the end points of the fire interval, i.e. the lower and upper fire threshold. The fire interval may comprise a lower fire threshold only, such that the pedestrian protection means is activated, if the evaluation algorithm exceeds that lower fire threshold. The fire interval may comprise an upper fire threshold only, such that the pedestrian protection means is activated, if the evaluation algorithm underpasses that upper fire threshold.

If more than one contact-based sensor is used, and especially if they are of different kinds, there may be different fire intervals for the different contact-based sensors.

The term pedestrian protection means as used herein includes protection means being useful for different other kinds of vulnerable road users, such as a pedestrian or a cyclist. If more than one pedestrian protection means are used, they may have individually selectable fire intervals. The individual fire interval may for example be selected dependent on how expensive and/or difficult it would be to repair/replace that protection means. Further, dependent on how the target object is classified, some protection means may be deemed more efficient than others for that object category and may thus have fire intervals such that they are activated before other pedestrian protection means being deemed less efficient in that situation.

The remote sensor may comprise a radar system, a lidar system, an ultrasonic system, a camera system, a stereo camera system, an IR camera system and/or a transceiver of a vehicle-2-vehicle system. The transceiver is an apparatus capable of transmitting and receiving information from other vehicles. In principle it would be enough with only a receiving function. The number of remote sensors may be one, two, three etc. They may for example be located at the front of the vehicle, at the windscreen or at the rear view mirror. The remote sensor may be used to detect the distance to the target object.

The size of the region to be scanned in front of the vehicle depends on the kind of remote sensor, but may typically be up to +/−90°. Further, it depends on the speed of the vehicle. The higher the speed of the vehicle is, the larger region in front of the vehicle is interesting to scan. However, even if the sensor only is able to scan the last meters in front of the vehicle, the input from the remote sensor may anyway in a meaningful way be used for classification of the target object and selecting the fire interval of the evaluation algorithm.

The target object is an object detected by the remote sensor. It may be another vehicle, a vulnerable road user, a dust bin by the road side, a traffic sign, an animal etc. Normally, it is only desirable to activate the pedestrian protection means if the target object actually is a vulnerable road user, such as a pedestrian or a cyclist. If the target object is another vehicle, the pedestrian protection means will not help the occupants of either the own or the other vehicle. If the target object is not a vulnerable road user, for example a dust bin, a traffic sign or an animal, there is no desire to activate irreversible protection means, since it may lead to costly replacements and/or repairs.

The contact-based sensor may comprise an accelerometer, a pressure sensor, a light sensor, a fibre-optic sensor, a contact foil and/or a piezoelectric sensor. Normally, there is a plurality of contact-based sensors at different locations in the vehicle. The number of contact-based sensors may be one, two, three etc. They may be of different kinds There may be a situation in which more than one target object is detected in front of the vehicle. In that case data of the detected target objects may be organized pairwise, such that detection data from the remote sensor about a certain target object may be coupled to information from one or more contact-based sensor about that certain target object. The method described above may be used for each target object individually, although the execution of the method in that case time-wise may overlap for the different target objects.

The classification of target object into an object category may be performed by means of image analysis. Such image analysis methods are known by the skilled person and will not be further described herein. In addition, the image analysis may be combined with information from the remote sensor about the speed of the target object relative to the vehicle for classifying the target object into an object category. It is for example known that a pedestrian or a cyclist normally moves slower than another vehicle. On the other hand, objects such as a dust bin or a traffic sign normally stands still. If knowing the speed and direction of the own vehicle, the absolute speed and direction of the target object may be determined.

A plurality of n different object categories may be used corresponding to n fire intervals of the evaluation algorithm, n preferably being between 2 and 20, more preferably between 2 and 10 and most preferably between 2 and 5.

The n fire intervals may differ as regards the upper and/or lower fire threshold. They may overlap.

Purely as an example, in one embodiment the target object may be classified according to three object categories:

a no-fire object category, corresponding to a first fire interval of the evaluation algorithm, a fire object category, corresponding to a second fire interval of the evaluation algorithm, or an undefined object category, corresponding to a third fire interval.

If the selectable fire interval comprises a lower threshold, which is to be exceeded in order to activate the pedestrian protection means, the no-fire object category would correspond to a high fire threshold, the fire object category would correspond to a low fire threshold and the undefined object category to a threshold therebetween.

The no-fire object category is used for a dust bin by the road side, a traffic sign, a tree, a light pole, a pole, a road side barrier, a truck, a bus, a car, a small animal etc. For these kinds of objects there is no desire to activate any pedestrian protection means.

The fire object category is used for a vulnerable road user, e.g. a pedestrian or a bicyclist. For these kinds of objects, a pedestrian protection means will mitigate the consequences of a possible collision.

The undefined object category is used for objects neither being classified as a no-fire object, nor as a fire object. This may be due to that the object is neither a vulnerable road user, nor a no-fire object. Alternatively, the target object may be difficult to classify. The target object is then classified in the undefined object category, which is a medium category.

In case an impact is detected by the contact-based sensor without any previous detection of a target object by the remote sensor, the fire interval of the evaluation algorithm may be set to a predefined default range. In a system using the three above-mentioned object categories, the default range may in that case correspond to the undefined object category.

As an alternative to having a fixed number of object categories, the range of the fire interval of the evaluation algorithm may be steplessly selectable, corresponding to an infinite number of different object categories. The upper and/or lower fire threshold may be steplessly changed. They may be changed independently of each other. The information from the remote sensor may in that case be used for selecting the fire interval of the evaluation algorithm according to a confidence level of the object classification, wherein the confidence level is a number between 0% and 100%, with 100% meaning that the object classification is absolutely confident and 0% meaning an arbitrary classification.

The method may further comprise the step of determining a height of the target object by means of information from the remote sensor. In that case the classifying of the target object into an object category may also use the determined height as input. For example, the height of moving human being is statistically known and differentiates a human being from a cat or a dog. Further, if the height is low, e.g. lower than the bonnet, there is no use activating a pedestrian protection means being at the height of the bonnet or higher.

The method may further comprise the step of determining a predicted impact point on the vehicle based on information from the remote sensor. The determined impact point may be used for selection of a subset of contact-based sensors from the plurality of contact-based sensors comprised in different location in the vehicle. Information from contact-based sensors not belonging to the subset may be treated with less weight. Information about the impact point may further be used to select which protection means to activate.

The method may further comprise the step of determining a speed of the vehicle when the contact-based sensor detects an impact, and only activating the pedestrian protection means if the speed of the vehicle at impact of the target object with the contact-based sensor is within a predefined speed interval, the predefined speed interval for example being between 0 and 70 km/h, preferably between 0 and 60 km/h, more preferably being between 10 and 60 km/h, and most preferably being between 20 and 50 km/h.

If using a lower speed limit of the predefined speed interval other than 0 km/h, such as 20 km/h, below which the pedestrian protection means is not activated, the lower speed limit may be selected such that below that speed, the vulnerable road user would normally not risk any severe injuries, e.g.

because of the low speed and/or because of other protection means of the vehicle. In such a case, it would be an advantage not to activate an irreversible pedestrian protection means, since the protection means would have to be replaced or repaired after activation, e.g. at a workshop.

The upper speed limit may be selected according to the capability of the deployable bonnet, such that the attachment of the bonnet to the vehicle body is ensured if the bonnet is deployed at that speed. However, if the pedestrian protection means comprises an airbag, the upper speed limit may be set to the maximum speed of the vehicle, since the airbag may be deployed at any speed of the vehicle.

In a second aspect of the present disclosure, there is provided a system for protection of a vulnerable road user, the system comprising
- a remote sensor for detecting a target object at a distance,
- a contact-based sensor,
- a pedestrian protection means,
- a classifier, and
- a computational unit comprising an evaluation algorithm for activation of the pedestrian protection means, wherein the remote sensor is adapted to send information to the classifier, the classifier is adapted to classify the target object into an object category, the contact-based sensor is arranged to send information as a signal to the evaluation algorithm, the evaluation algorithm has a selectable fire interval, which is selected based on the object category, and the pedestrian protection means is activated if the signal is evaluated as being within the selectable fire interval.

The classifier may comprise an image analysis system. The classifier may be part of the computational unit.

The remote sensor may comprise a radar system, a lidar system, an ultrasonic system, a camera system, a stereo camera system an IR camera system and/or a transceiver of a vehicle-2-vehicle system.

The contact-based sensor may comprise an accelerometer, a pressure sensor, a light sensor, a fibre-optic sensor, a contact foil and/or a piezoelectric sensor. Normally there is a plurality of contact-based sensors at different locations in the vehicle.

The system may further comprise means for determining the speed of the target object and/or the speed of the vehicle. The means may determine relative and/or absolute speed.

In a third aspect of the present disclosure, there is provided a vehicle comprising the system for protection of a vulnerable road user according to above.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
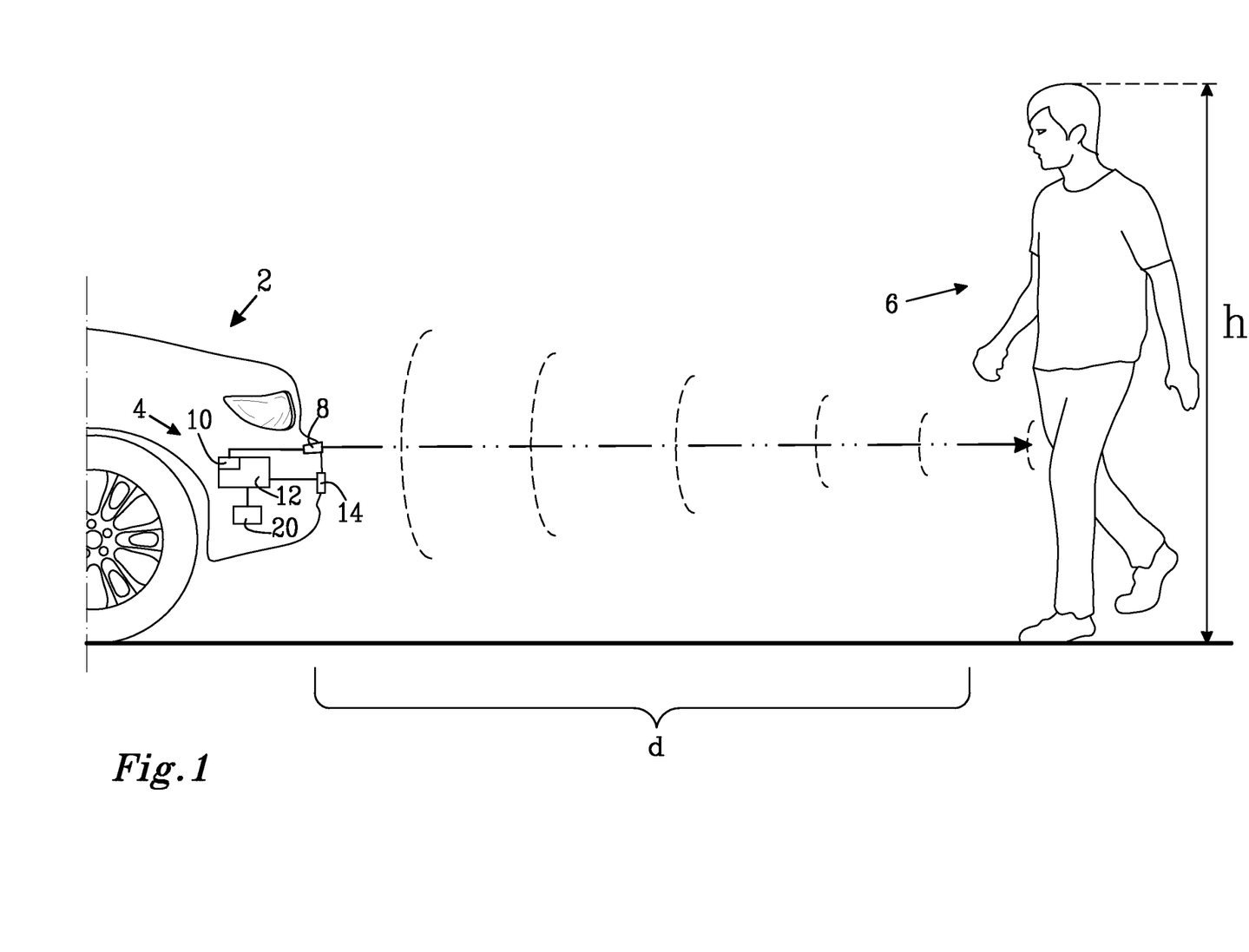
FIG. 1 illustrates a vehicle comprising a system for protection of a vulnerable road user according to the disclosure when detecting a target object.

FIG. 1 schematically illustrates a vehicle 2 comprising a system 4 for protection of a vulnerable road user according to the disclosure when detecting a target object. In the example the target object is a vulnerable road user in the form a pedestrian 6 crossing the road in front of the vehicle 2.

The system 4 comprises at least one remote sensor 8 for detecting the target object at a distance d. The remote sensor 8 may comprise a radar system, a lidar system, an ultrasonic system, a camera system, a stereo camera system, IR camera system and/or a transceiver of a vehicle-2-vehicle system. The remote sensor 8 is adapted to send information to a classifier 10, being used for classifying the target object into an object category, which will be further described below. The classifier 10 is in the illustrated embodiment part of a computational unit 12, e.g. a processor, but may also be a separate unit. The classifier 10 may comprise an image analysis system being used for the object classification.

Figure 2:
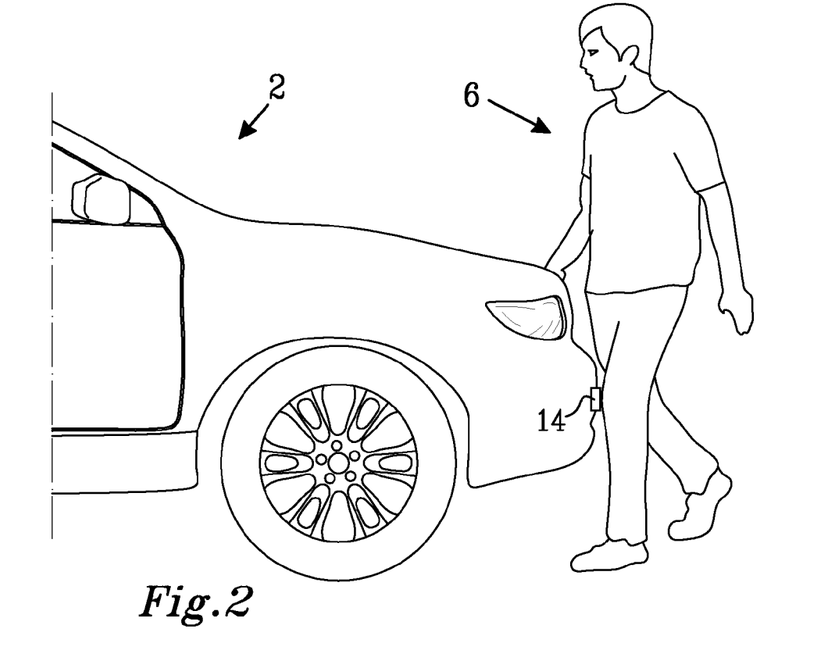
FIG. 2 illustrates the vehicle of FIG. 1 at an impact with the target object.
Figure 3:
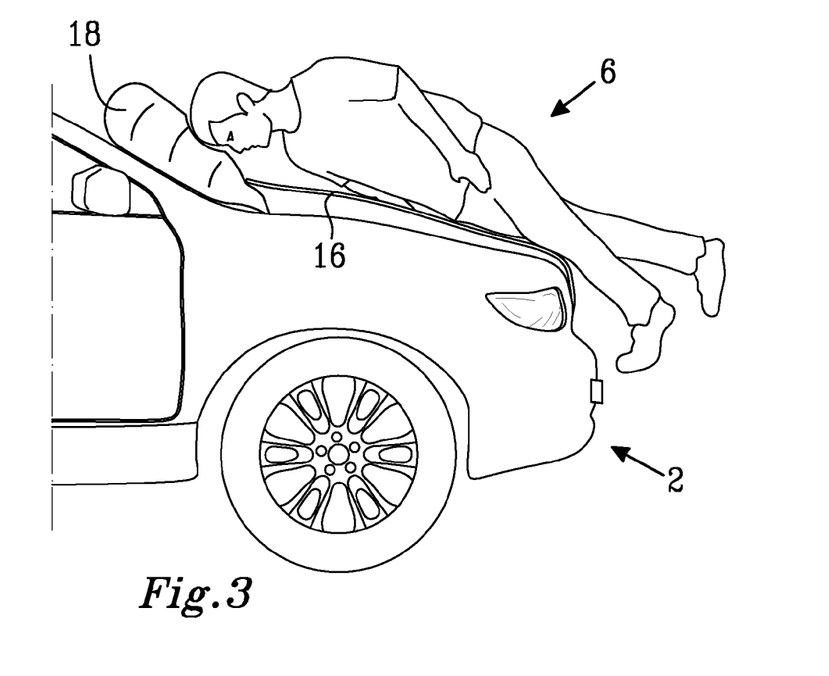
FIG. 3 illustrates the vehicle of FIG. 1 with activated pedestrian protection means.

The system 4 further comprises at least one contact-based sensor 14, such as an accelerometer, a pressure sensor, a light sensor, a fibre-optic sensor, a contact foil and/or a piezoelectric sensor. The contact-based sensor 14 is adapted to detect an object being in contact with and/or in a close proximity of the contact-based sensor 14, e.g. a pedestrian 6, as shown in FIG. 2. Normally, there is a plurality of contact-based sensors at different locations in the vehicle, even if only one is shown in FIGS. 1-3.

The contact-based sensor 14 sensor is adapted to feed an evaluation algorithm with information. The evaluation algorithm may consider the information as a raw data, e.g. measured acceleration, an integral of the raw data, e.g. speed, and/or as a double integral of the raw data, e.g. distance.

The evaluation algorithm is comprised in the computational unit 12. The evaluation algorithm has a selectable fire interval, which fire interval is selected using data from the classifier 10 regarding the object category as input. If the signal is within the fire interval, a pedestrian protection means will be activated, e.g. in the form of a deployable bonnet 16 and/or one or more airbags 18 covering the windscreen and/or the A-pillars of the vehicle 2. See FIG. 3. Thereby the consequences of the collision for the vulnerable road user are mitigated.

Purely as an example, the target object may be classified according to three object categories:
a no-fire object category, corresponding to a first fire interval of the evaluation algorithm,
a fire object category, corresponding to a second fire interval of the evaluation algorithm, or
an undefined object category, corresponding to a third fire interval.

If the selectable fire interval comprises a lower threshold, which is to be exceeded in order to activate the pedestrian protection means, the no-fire object category would correspond to a high fire threshold, the fire object category would correspond to a low fire threshold and the undefined object category to a threshold therebetween.

The no-fire object category is used for a dust bin by the road side, a traffic sign, a tree, a light pole, a pole, a road side barrier, a truck, a bus, a car, a small animal etc. For these kinds of objects there is no desire to activate any pedestrian protection means.

The fire object category is used for a vulnerable road user, e.g. a pedestrian 6 or a bicyclist. For these kinds of objects, a pedestrian protection means will mitigate the consequences of a possible collision.

The undefined object category is used for objects not being classified as a no-fire object or a fire object. This may be due to that the object is neither a vulnerable road user nor a no-fire object. Further, the target object may be difficult to classify. The object is thus placed in the undefined object category, which is a medium category.

In the illustrated embodiment, the system additionally comprises means to determine the speed of the target object, e.g. the pedestrian 6 in FIG. 1, e.g. in relation to the vehicle 2. This means may be comprised in the remote sensor 8. The speed information is used as complementary input for the classification of the target object. It is for example known that a pedestrian or a cyclist normally moves slower than another vehicle. On the other hand, objects such as a dust bin or a traffic sign normally stands still.

The vehicle 2 may also comprise means 20 for determining the speed of the vehicle 2 itself, which may be a vehicle speedometer. The system 4 may be configured such that the pedestrian protection means 16, 18 are only activated if the vehicle has a speed at impact with the target object being in a predefined speed interval, for example being between 0 and 70 km/h, preferably between 0 and 60 km/h, more preferably being between 10 and 60 km/h, and most preferably being between 20 and 50 km/h.

If using a lower speed limit of the predefined speed interval other than 0 km/h, such as 20 km/h, below which the pedestrian protection means 16, 18 is not activated, the lower speed limit may be selected such that below that speed, the vulnerable road user would normally not risk any severe injuries, e.g. because of the low speed and/or because of other protection means of the vehicle 2. In such a case, it would be an advantage not to activate an irreversible pedestrian protection means, such as a pyro-technical bonnet lifter or an airbag 18 covering the windscreen, since the protection means would have to be replaced after activation, e.g. at a workshop.

The upper speed limit may be selected according to the capability of the deployable bonnet, such that the attachment of the bonnet to the vehicle body is ensured if the bonnet is deployed at that speed. However, if the pedestrian protection means comprises an airbag, the upper speed limit may be set to the maximum speed of the vehicle, since the airbag may be deployed at any speed of the vehicle 2.

The information from the remote sensor 8 may be used to determine a height h of the target object, e.g. the pedestrian 6 of FIG. 1. The height h is usable as input for the object classification, as well as being used as input for the evaluation algorithm. For example, the height of moving human being is statistically known and differentiates a human being from e.g. a cat or a dog. Further, if the height h is low, e.g. lower than the bonnet, there is no use activating a pedestrian protection means being at the height of the bonnet or higher.

The information from the remote sensor 8 may be used to determine an impact point on the vehicle 2. The determined impact point may be used for selection of a subset of contact-based sensors from the plurality of contact-based sensors comprised in different locations in the vehicle. Information from contact-based sensors not belonging to the subset may be treated with less weight. The choice of which pedestrian protection means to activate may be selected based on the information about the impact point.

Under normal operation of the system 4, a region in front of the vehicle 2 is continuously or intermittently scanned by means of the at least one remote sensor 8 in order to detect a possible target object, e.g. the pedestrian 6 of FIG. 1. Further, the at least one contact-based sensor 14 is operable, such that it is able to detect if an impact occurs. The remote sensor/s 8 may work independently of the contact-based sensor/s 14.

Figure 4:
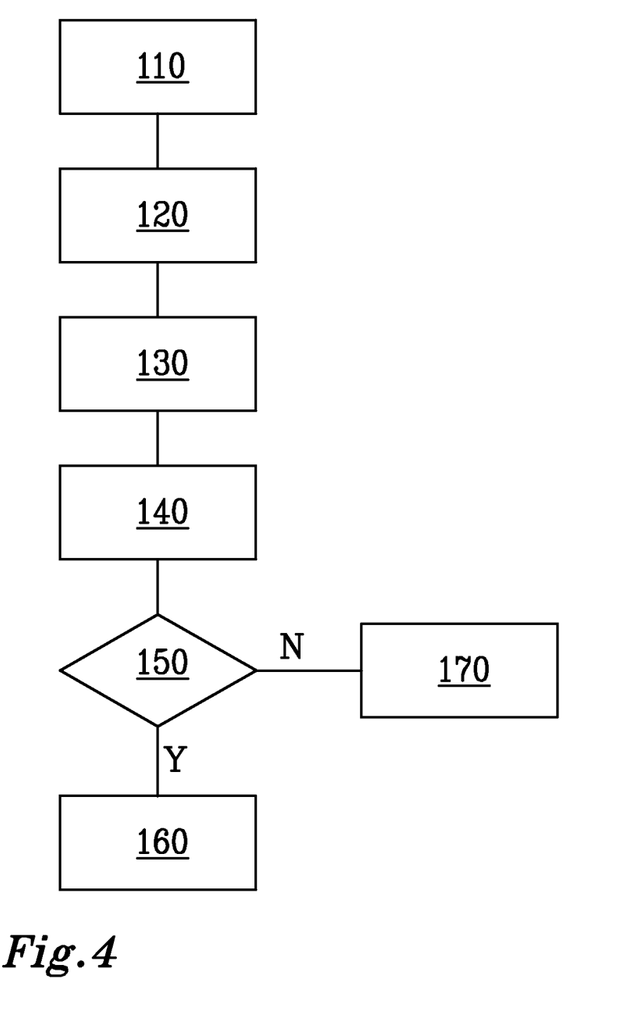
FIG. 4 is a flowchart of a method according to the disclosure.

FIG. 4 is a flow chart of a method according to the disclosure illustrating what happens when a target object is detected by the remote sensor 8 and an impact is detected by the contact-based sensor 14.

In a first step 110, the target object, e.g. the pedestrian 6 of FIG. 1, is detected by the remote sensor 8. The target object is classified into an object category by means of information from the remote sensor, step 120. The object classification is used as input for selecting the fire interval of the evaluation algorithm, step 130.

Next, in step 140, information about an impact with an object is sent from the contact-based sensor 14 as a signal to the evaluation algorithm, which in step 150 evaluates if the signal is within the selected fire interval, and in that case activates the pedestrian protection means, step 160. If not being within the fire interval in step 150, the pedestrian protection means is not activated. The system 4 then goes back to normal operation step 170.

Since the target object 6 is detected at a distance d from the vehicle 2, there will be a time span in between the detection of the target object 6 by the remote sensor 8 and the possible actual impact between the target object 6 and the vehicle 2 detected by the contact-based sensor 14. The method may thus keep checking if an impact has occurred, until the impact actually occurs and then use the evaluation algorithm for deciding about whether or not to activate the pedestrian protection means.

The remote sensor 8 may be used to determine the distance d to the target object and thus to predict when an impact is going to occur based on the knowledge of the distance d and the speed of the vehicle 2 in relation to the target object. If the contact-based sensor 14 does not detect an impact within a reasonable time, the system may go back to normal operation again. This may for example be due to that the target object has moved out of the way of the vehicle 2.

The system 4 may use the information about the distance d and the speed of the vehicle 2 in relation to the target object in order to select a suitable timing for sending data about the classification of the target object to the evaluation algorithm, such that the classification data are coupled to the information from the contact-based sensor 14 about the impact with that target object. Alternatively, the classification data may be sent together with data about time to predicted impact. In that case the computational unit 12 is able to store the classification data at least until the time to the predicted impact has elapsed. The data transmission from the remote sensor may be done periodically, e.g. once every 10-100 millisecond.

In case an impact is detected by the contact-based sensor 14 without any previous detection of a target object 6 by the remote sensor 8, the fire interval of the evaluation algorithm may be set to a predefined default range. In a system using the three above-mentioned object categories, the default range may in that case correspond to the undefined object category.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a system of a vehicle for protection of a vulnerable road user, said system comprising a remote sensor, a contact-based sensor and a pedestrian protection means, the method comprising:
    scanning a region in front of said vehicle by said remote sensor in order to detect a target object;
    if a target object is detected, classifying said target object into an object category based on information from said remote sensor;
    selecting a selectable fire interval of an evaluation algorithm using said object category as input;
    if an impact is detected by said contact-based sensor, said contact-based sensor sending information about the impact as a signal to said evaluation algorithm;
    said evaluation algorithm evaluating if said signal is within said selectable fire interval, and in that case activating said pedestrian protection means;
    wherein a plurality of n different object categories is used corresponding to n fire intervals of said evaluation algorithm, n being between 2 and 20.

2. The method according to claim 1, wherein image analysis is utilized for classifying said target object into one of the object categories.

3. The method according to claim 2, wherein said image analysis is combined with information from said remote sensor about the speed of said target object relative to said vehicle for classifying said target object into one of the object categories.

4. The method according to claim 1, wherein said target object is classified according to one of the object categories comprising:
    a no-fire object category, corresponding to a first fire interval of said evaluation algorithm;
    a fire object category, corresponding to a second fire interval of said evaluation algorithm; and
    an undefined object category, corresponding to a third fire interval of said evaluation algorithm.

5. The method according to claim 1 further comprising determining a height (h) of said target object by information from said remote sensor, said classifying of said target object into one of the object categories also being based on said determined height (h).

6. The method according to claim 1 further comprising determining a predicted impact point on said vehicle based on information from said remote sensor, using said predicted impact point for selection of a subset of contact-based sensors from a plurality of contact-based sensors in said vehicle.

7. The method according to claim 1 further comprising determining a speed of said vehicle when said contact-based sensor detects an impact, and only activating said pedestrian protection means if the speed of said vehicle is within a predefined speed interval.

8. The method according to claim 1, wherein the plurality of n different object categories is used corresponding to n fire intervals of said evaluation algorithm, n being between 2 and 10.

9. The method according to claim 1, wherein the plurality of n different object categories is used corresponding to n fire intervals of said evaluation algorithm, n being between 2 and 5.

10. A method for operating a system of a vehicle for protection of a vulnerable road user, said system comprising a remote sensor, a contact-based sensor and a pedestrian protection means, the method comprising:
    scanning a region in front of said vehicle by said remote sensor in order to detect a target object;
    if a target object is detected, classifying said target object into an object category based on information from said remote sensor;
    selecting a selectable fire interval of an evaluation algorithm using said object category as input;
    if an impact is detected by said contact-based sensor, said contact-based sensor sending information about the impact as a signal to said evaluation algorithm;
    said evaluation algorithm evaluating if said signal is within said selectable fire interval, and in that case activating said pedestrian protection means;
    wherein the range of the fire interval of said evaluation algorithm is steplessly selectable, corresponding to an infinite number of different object categories.

11. A system for protection of a vulnerable road user, the system comprising:
    a remote sensor for detecting a target object at a distance (d);
    a contact-based sensor;
    a pedestrian protection means;
    a classifier; and
    a computational unit comprising an evaluation algorithm for activation of said pedestrian protection means;
    wherein said remote sensor is adapted to send information to said classifier, said classifier is adapted to classify said target object into an object category, said contact-based sensor is arranged to send information as a signal to said evaluation algorithm, said evaluation algorithm has a selectable fire interval selected based on said object category, said pedestrian protection means is activated if said signal is evaluated as being within said selectable fire interval, and a plurality of n different object categories is used corresponding to n fire intervals of said evaluation algorithm, n being between 2 and 20.

12. The system according to claim 11, wherein said classifier comprises an image analysis system.

13. The system according to claim 11, wherein said remote sensor comprises a radar system, a lidar system, an ultrasonic system, a camera system, a stereo camera system, an IR camera system and/or a transceiver of a vehicle-2-vehicle system.

14. The system according to claim 11, wherein said contact-based sensor comprises an accelerometer, a pressure sensor, a light sensor, a fibre-optic sensor, a contact foil and/or a piezoelectric sensor.

15. The system according to claim 11 further comprising means for determining the speed of said target object and/or the speed of the vehicle.

16. The system of claim 15 wherein the means for determining the speed of said target object and/or the speed of the vehicle comprises the remote sensor.

17. A vehicle comprising the system for protection of a vulnerable road user according to claim 11.

18. The system according to claim 11 wherein the pedestrian protection means comprises a deployable bonnet and/or or one or more airbags.

19. The system according to claim 11, wherein the plurality of n different object categories is used corresponding to n fire intervals of said evaluation algorithm, n being between 2 and 10.

20. The system according to claim 11, wherein the plurality of n different object categories is used corresponding to n fire intervals of said evaluation algorithm, n being between 2 and 5.

* * * * *